United States Patent [19]
Dranchak

[11] Patent Number: 5,355,628
[45] Date of Patent: Oct. 18, 1994

[54] WEATHERSTRIP FOR A VEHICLE DOOR

[75] Inventor: Lawrence J. Dranchak, Taylor, Mich.

[73] Assignee: Ford Motor Company, Dearborn, Mich.

[21] Appl. No.: 909,835

[22] Filed: Jul. 7, 1992

[51] Int. Cl.$^5$ .................................................. E06B 7/16
[52] U.S. Cl. .................................. 49/483.1; 49/490.1
[58] Field of Search ........................ 49/483, 491, 490.1

[56] References Cited

U.S. PATENT DOCUMENTS

| | | | |
|---|---|---|---|
| 1,954,439 | 4/1934 | Burch | 20/69 |
| 1,989,842 | 2/1935 | Barringer | 20/69 |
| 2,556,062 | 6/1951 | Buehrig | 296/137 |
| 2,899,256 | 8/1959 | Kelley | 312/296 |
| 3,461,611 | 8/1969 | Axe | 49/483 |
| 4,030,245 | 6/1977 | Yeomans | 49/490 |
| 4,457,111 | 7/1984 | Koike | 49/441 |
| 4,653,801 | 3/1987 | Shirasu et al. | 296/202 |
| 4,932,161 | 6/1990 | Keys et al. | 49/491 |
| 5,039,161 | 8/1991 | Schmidhuber et al. | 49/483 X |
| 5,106,149 | 4/1992 | Glossop, Jr. et al. | 296/213 |
| 5,123,693 | 6/1992 | Karashima et al. | 49/491 X |

FOREIGN PATENT DOCUMENTS

| | | | |
|---|---|---|---|
| 717267 | 1/1977 | U.S.S.R. | |
| 519252 | 3/1940 | United Kingdom | |
| 770023 | 3/1957 | United Kingdom | 49/483 |

*Primary Examiner*—Philip C. Kannan
*Attorney, Agent, or Firm*—Roger May; Daniel M. Stock

[57] ABSTRACT

A weatherstrip for a vehicle having a seal gap defined by a door and a door flange surrounding a door opening is provided. The weatherstrip includes a magnet positioned around the door opening in the seal gap such that the door is magnetically secured thereto when the door is closed. The weatherstrip also includes a resilient web having a pocket in which the magnet is mounted and a gripping member having a channel for straddling the door flange. The gripping member has at least one rib on an internal wall of the channel for affixing the gripping member to the door flange. Also, the gripping member is integrally joined to the web to provide a weatherstrip which substantially seals the seal gap when the door is closed.

7 Claims, 3 Drawing Sheets

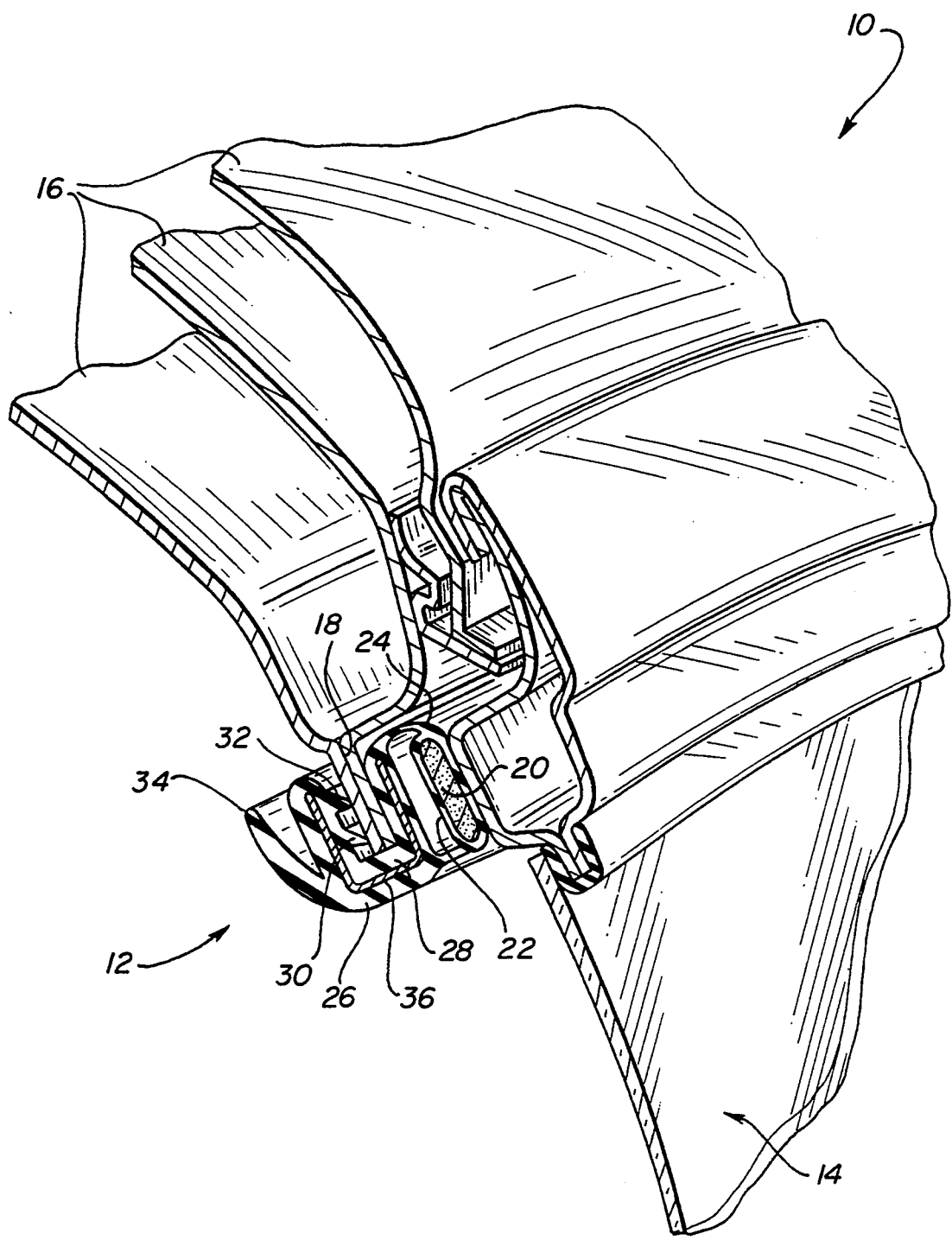

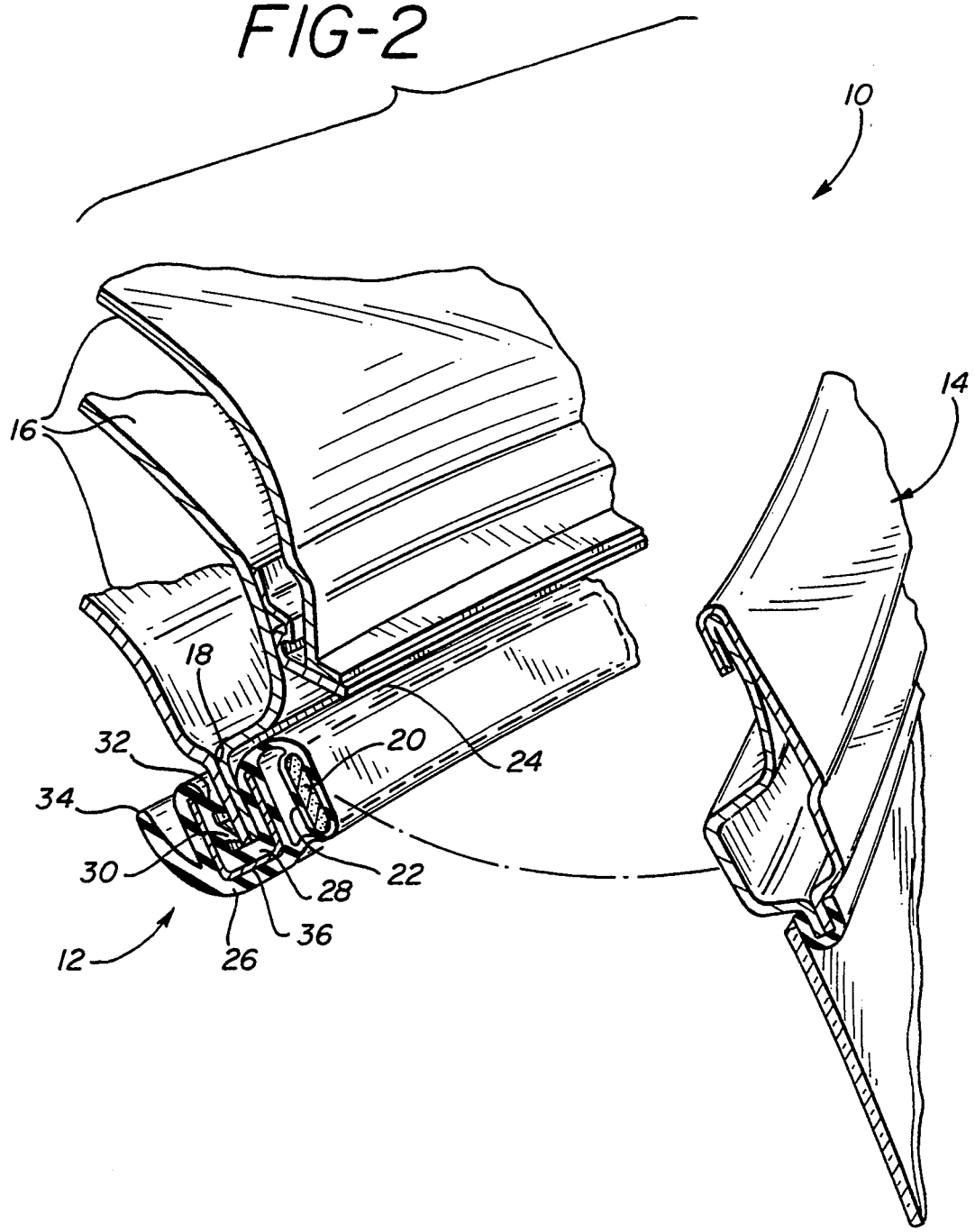

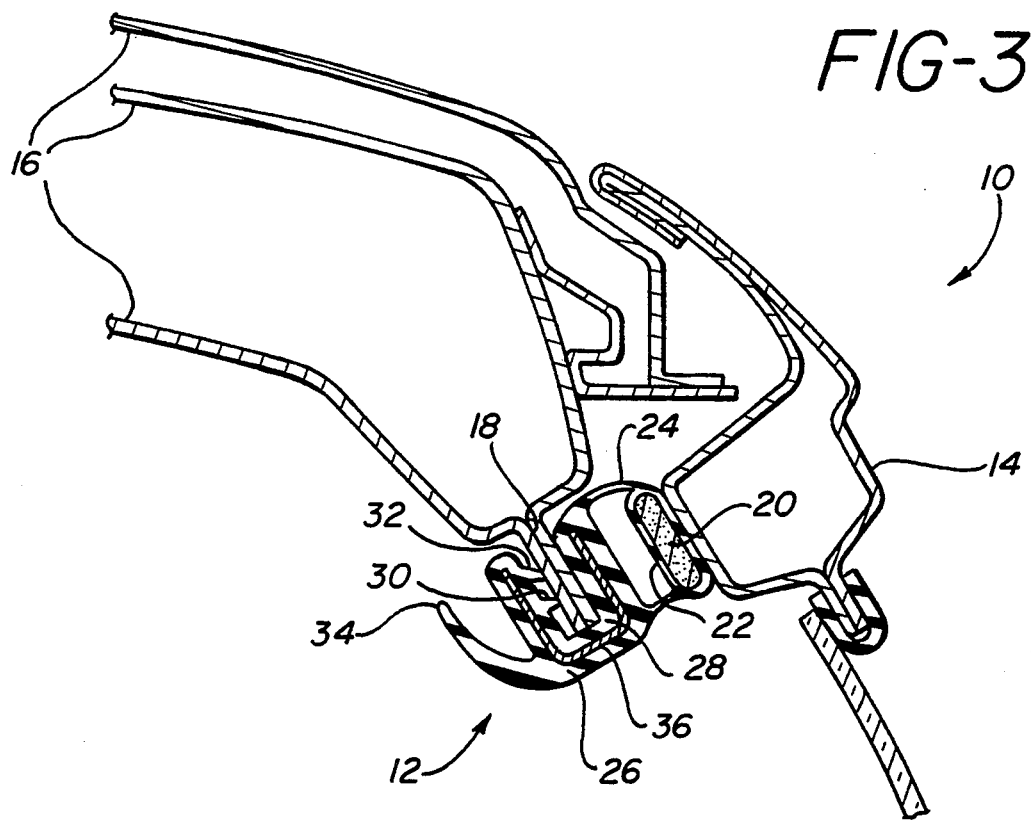
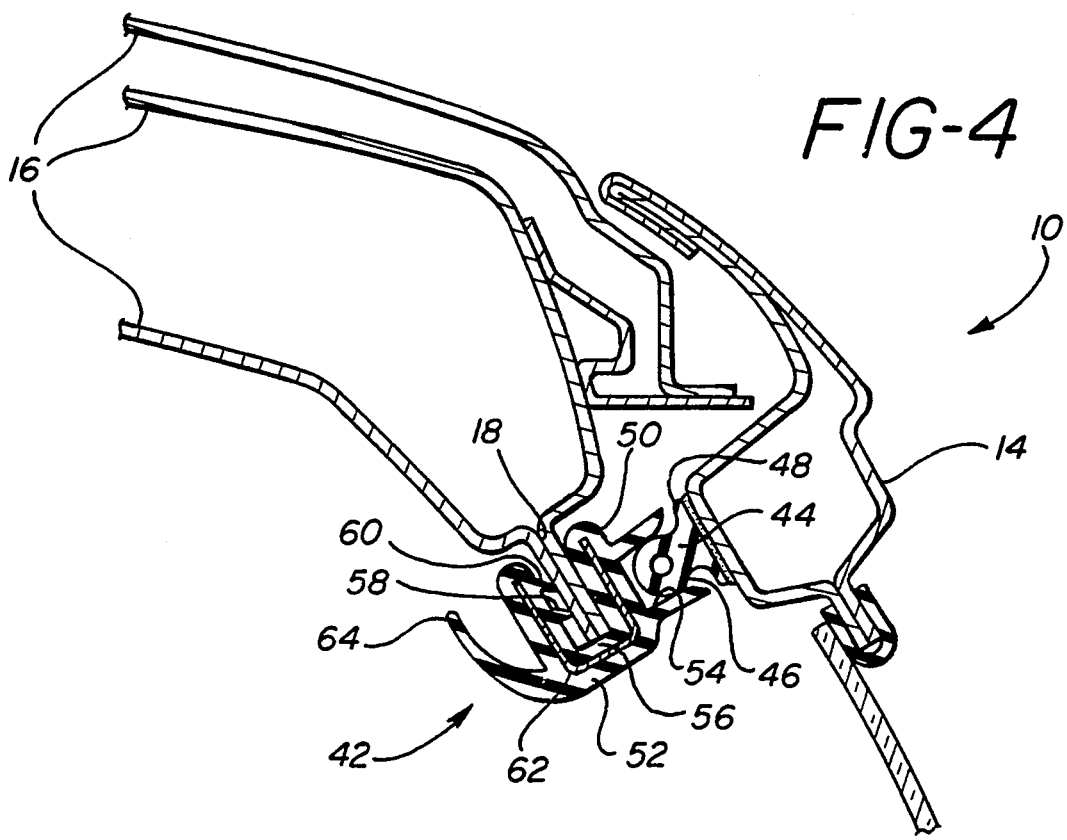

WEATHERSTRIP FOR A VEHICLE DOOR

BACKGROUND OF THE INVENTION

The present invention generally relates to weatherstrips for vehicles and more particularly, to a weatherstrip for the seal gap in the door assembly of a vehicle. The weatherstrip provides a constant or complete seal between the door and vehicle body so as to reduce noise attributed to air passing through the seal gap as the vehicle moves.

In all vehicles, a seal gap defined as the void space created between the door or body flange and the door assembly is present. As is known, weatherstrips, which are oftentimes referred to as sealing strips, are used to seal. this seal gap. This is an effort to reduce wind noise caused by air passing through such a void space at high velocities. In the past, weatherstrips for vehicles were attached to the door flange around the door opening and a resilient hollow bulb or bead was affixed thereto for purposes of sealing the door opening and cushioning the force with which the door contacted the bead upon closing.

Yeomans, U.S. Pat. No. 4,030,245, is representative of the vast array of past weatherstrips of this type. More specifically, Yeomans discloses a channel-shaped sealing strip which has a gripping portion for attachment to the door flange and an integrally joined sealing portion in the shape of a bead or bulb. These types of weatherstrips, however, provide for an incomplete or nonconstant seal between the door and the weatherstrip in that the seal gap width varies around the door opening. This variation is largely attributed to the limitations of assembly tolerances. For example, vehicle assembly facilities typically build a seal gap having a tolerance of ±3 mm which is relatively large in view of the typical nominal seal gap width of about 14 mm.

As a result, the bulb or bead portion of prior art weatherstrips does not contact the door completely around the door opening when it is closed. This incomplete or non-constant seal leads to an increased level of noise heard by passengers seated in the interior or the vehicle which is caused by wind to which the vehicle is subjected as it moves. While it is more desirable to have a weatherstrip having more material so as to achieve a complete seal, the additional material increases the closing force necessary for closing the door of the vehicle which is undesirable. Thus, it would be desirable to have a weatherstrip which provides a more complete seal between the door and the weatherstrip yet does not increase the amount of closing effort necessary to close the door on a vehicle. In that regard, the closing effort should not exceed a force of about 19 lbs.

Accordingly, there is a need in the art for a weatherstrip which provides a complete seal between the door and the weatherstrip in the seal gap of a vehicle door assembly. There is also a need for such a weatherstrip which does not require an excessive amount of closing effort to close the door of a vehicle.

SUMMARY OF THE INVENTION

The aforementioned needs in the art are met by the present invention which provides a weatherstrip having a complete seal between the door and the weatherstrip in the seal gap of a vehicle door assembly yet does not require an excessive amount of closing effort to close the door of a vehicle. The constant or complete seal provided by the present weatherstrip is exemplified by the reduction in wind noise heard by passengers seated in the vehicle.

In accordance with one aspect of the invention, a vehicle having a seal gap defined by a door and a door or body flange surrounding a door opening on the vehicle and a weatherstrip for sealing the seal gap is provided. The weatherstrip comprises a magnet positioned around the door opening in the seal gap such that the door is magnetically secured thereto when the door is in a closed position. Additionally, the weatherstrip includes means for supporting the magnet within the seal gap, and means for attaching the supporting means to the door flange. Preferably, the attaching means is integrally joined to the supporting means to substantially seal the seal gap when the door is in the closed position and the magnet is magnetically secured thereto.

In accordance with another aspect of the invention, a weatherstrip for a vehicle having a seal gap defined by a door and a door flange surrounding a door opening on the vehicle is provided. Preferably, the weatherstrip comprises a first member having a bulb portion and an integrally joined base which is adhesively secured to the door flange. Further, the weatherstrip includes a second member having a gripping portion for affixing the second member to the door flange and an outward facing securing channel correspondingly sized to receive the bulb portion of the first member when the door is in a closed position. Preferably, the second member is mounted around the door opening such that the bulb portion is firmly secured in the securing channel when the door is in the closed position so as to substantially seal the seal gap.

Accordingly, it is a feature of the present invention to provide a weatherstrip having a constant seal between the door and the weatherstrip in the seal gap of a vehicle door assembly; and, it is a feature of the invention to provide such a weatherstrip which does not require an excessive amount of closing effort to close the door of a vehicle. Other features and advantages of the invention will be apparent from the following detailed description, the accompanying drawings and the appended claims.

BRIEF DESCRIPTION OF THE DRAWINGS

FIG. 1 is a fragmentary perspective view of a vehicle door assembly including the weatherstrip of the invention;

FIG. 2 is a fragmentary perspective view of the vehicle door assembly illustrated in FIG. 1 wherein the door is in an open position;

FIG. 3 is a cross-sectional view of the vehicle door assembly depicted in FIG. 1; and FIG. 4 is a cross-sectional view of a vehicle door assembly illustrating another embodiment of the weatherstrip shown in FIG. 1.

DETAILED DESCRIPTION OF THE PREFERRED EMBODIMENTS

Referring now FIG. 1, a fragmentary perspective view of a vehicle door assembly 10 including a weatherstrip generally designated by reference numeral 12 is shown. As seen in FIG. 1, vehicle door assembly 10 includes a vehicle door 14 and a vehicle body generally designated by reference numeral 16. It should be understood that FIG. 1 illustrates only one of many possible designs suitable for door 14 and vehicle body 16 of vehicle door assembly 10. Of course, the design will depend upon the particular vehicle in which vehicle door assembly 10 is implemented. As a result, the particular design of door 14 and vehicle body 16 may deviate from that of which is shown in FIG. 1 without departing from the scope of invention described herein.

Nevertheless, all vehicles have a seal gap defined by the void space between door 14 and a door flange 18 surrounding the opening for door 14. It is this seal gap within which weatherstrip 12 is mounted as shown in FIG. 1. Specifically, door flange 18, which most often forms part of vehicle body 16, completely surrounds the door opening on the vehicle. Consequently, a seal gap is formed which surrounds the entire door opening. Such previous weatherstrips, however, have not been capable of substantially sealing the seal gap to a point at which noise attributed to wind has been reduced while also reducing or maintaining the effort required to close door 14. With weatherstrip 12, which is suitable for mounting in such seal gaps, the present invention provides these advantages.

Reference is now made to FIG. 2, as well as FIG. 1, wherein weatherstrip 12 also comprises a magnet 20 positioned around the opening to door 14 and in the seal gap such that door 14 is magnetically secured thereto when door 14 is in a closed position. In addition, weatherstrip 12 includes means for supporting magnet 20 within the seal gap. Preferably, the supporting means is a resilient web 22 having a pocket 24 in which magnet 20 is mounted such that magnet 20 is magnetically secured to door 14 when it is closed. The relative magnetism of magnet 20 can be controlled as desired by choosing among the wide range of magnets available. Preferably, however, magnet 20 will provide weatherstrip 12 with a seal force of about 0.28 lbs/lineal inch even though it is enclosed within pocket 24. Suitable magnet materials include barium ferrite and magnesium ferrite.

It is preferable for resilient web 22 to have walls with a curved or concave shape and a thickness in a range from about 0.70 mm to about 1.0 mm. In this way, resilient web 22 operates as a resilient or flexible web for purposes of cushioning the impact of door 14 when it is closed. The manner in which door 14 contacts weatherstrip 12 is most clearly seen in FIG. 2. As seen in FIG. 2, door 14, which is typically formed of a magnetic material, such as steel or the like, is closed such that it contacts pocket 24 within which magnet 20 is mounted so as to be magnetically adhered thereto. The resulting seal is improved by this magnetic attraction between door 14 and magnet 20. Additionally, wind noise in the interior of the vehicle is reduced.

Further, weatherstrip 12 comprises means for attaching resilient web 22 to door flange 18. In accordance with the invention, the preferable attaching means is a gripping member 26 having walls which define a channel 28 for straddling door flange 18 and a pair of ribs 30 and 32 on an internal wall of channel 28. As seen in FIG. 1, by providing gripping member 26 with channel 28 and ribs 30 and 32, gripping member 26 can be easily and firmly secured or affixed to door flange 18. While ribs 30 and 32 are depicted in FIG. 1, those skilled in the art will appreciate that gripping member 26 need not include rib 30 and/or rib 32 yet remain affixed to door flange 18.

Preferably, gripping member 26 is integrally joined or formed as a single piece with resilient web 24 so to substantially seal the seal gap when door 14 is in the closed position and magnet 20 is magnetically secured thereto. Additionally, gripping member 26 preferably includes a channel member 36 located within the walls of channel 28. It should be understood that channel member 36 is included for the purpose of providing added rigidity and support in gripping member 26 of weatherstrip 12 and may be excluded from weatherstrip 12 without departing from the scope of the invention. Furthermore, it is preferable for gripping member 26 as well as resilient web 24 to comprise an elastomeric material so as to impart resiliency to weatherstrip 12. Preferably, the elastomeric material is selected from the group consisting of terpolyolefins, polyvinylchloride, and polymerized ethylene propylene diene monomer. As discussed previously, the resilient character of resilient web 24 and gripping member 26 is extremely desirable in view of the force with which door 14 repeatedly contacts weatherstrip 12 as it is opened and closed.

FIGS. 1 and 2 also show weatherstrip 12 as further comprising an interior trim flap 34 extending from gripping member 26 into the interior of the vehicle. As those skilled in the art will appreciate, trim flap 34 is included for purposes of decoration so as to provide passengers in the vehicle with an aesthetic interior view of the periphery of door 14. While it is preferable for trim flap 34 to be formed from the same materials as gripping member 26 and resilient web 24, it should be understood that other materials having various colors may be used. Additionally, the particular size of trim flap 34, as well as the other components of weatherstrip 12, will vary depending upon the particular vehicle to which weatherstrip 12 is attached. As discussed previously, however, it is preferable to have the size of weatherstrip 12 to be tailored to the vehicle's seal gap.

Reference is now made to FIG. 3 which presents a cross-sectional view of vehicle door assembly 10. FIG. 3 provides a better view of the various components of weatherstrip 12, all of which are shown to be integrally joined together. More particularly, weatherstrip 12 is preferably formed substantially as a single piece such that resilient web 24, gripping member 26 and trim flap 34 are integrally joined together. In this way, manufacture time is reduced resulting in a less expensive weatherstrip 12. As those skilled in the art will appreciate, all of the components of weatherstrip can be integrally joined by extruding resilient web 24 having pocket 22, gripping member 26 and trim flap 34 through a single die while simultaneously feeding channel member 36 into the gripping member portion of the die. External to such an extrusion die, magnet 20 can be fed and mounted into pocket 22 to result in weatherstrip 12 in accordance with the invention. While such a method provides an expeditious and inexpensive means by which weatherstrip 12 can be manufactured, it should be understood that weatherstrip 12 can be made by other techniques without departing from the scope of the invention.

Referring now to FIG. 4, a cross-sectional view of another embodiment of the invention is shown. More specifically, FIG. 4 illustrates vehicle assembly 10 having a weatherstrip, generally designated by reference numeral 40 and more particularly herein, which fills the seal gap created by door 14 and vehicle body 16. As seen in FIG. 4, a first member 44 having a bulb portion 46 which has a regularly curvilinear shape and an integrally joined base 48 which is adhesively secured to door flange 18. Preferably, weatherstrip 42 also includes a second member generally designated as 50 having a gripping portion 52 for affixing member 50 to door flange 18. Further, member 50 includes an outward facing securing channel 54 correspondingly sized to receive bulb portion 46 when door 14 is in a closed position as shown in FIG. 4. In addition, member 50 is mounted around the door opening for door 14 on the vehicle such that bulb portion 46 of member 44 is firmly secured in securing channel 54 when door 14 is closed so as to substantially seal the seal gap.

Preferably, gripping portion 52 comprises a gripping channel 56 for straddling door flange 18 and a pair of ribs 58 and 60 located on an internal wall of gripping channel 56 for affixing member 50 to door flange 18. As those skilled in the art will appreciate, either one or both of ribs 58 and 60 may be eliminated from weatherstrip 42 without affecting its operability. Similar to weatherstrip 12 shown in FIGS. 1-3, weatherstrip 42 preferably includes a reinforcing wire 62 located in the walls of gripping channel 56 for providing additional rigidity. Also as shown in FIG. 4, weatherstrip 42 comprises an interior trim flap 64 substantially similar to trim flap 34 of weatherstrip 12 which extends from gripping portion 52 of member 50 into the interior of the vehicle.

With respect to the materials which form weatherstrip 42, it is preferable for member 44 to comprise a rigid elastomeric material and member 50 to comprise a resilient elastomeric material. In this way, bulb portion 46 is more easily inserted into securing channel 54 upon closing of door 14. More particularly, the rigid elastomeric material preferably has a hardness in a range from about 30 Shore A to about 40 Shore A. The resilient elastomeric material preferably has a hardness of about 20 Shore A to about 25 Shore A. Those skilled in the art will appreciate that the easy insertion of bulb portion 46 is attributed, in part, to the rigid elastomeric material being contacted with the more resilient elastomeric material of securing channel 54. It is also attributed to the design of bulb portion 46 coupled with the corresponding securing channel 54 which forms a substantially tight seal when door 14 is closed. As discussed above, the prior art weatherstrips did not provide such a feature.

Preferably, the resilient elastomeric material is selected from the group consisting of polymerized ethylene propylene diene monomer, terpolyolefins and mixtures thereof. The rigid elastomeric material preferably comprises natural rubber. It should be understood, however, that materials other than those described herein with respect to the rigid elastomeric material and the resilient elastomeric material may be used without departing from the scope of the invention.

Similar to weatherstrip 12, member 50 of weatherstrip 42 is preferably formed substantially as a single piece such that securing channel 54, gripping portion 52 and trim flap 64 (if included) are integrally joined. In this way, manufacture time is reduced resulting in a less expensive weatherstrip 42. Additionally, member 44 is formed as single piece such that base 48 and bulb portion 46 are integrally joined. Those skilled in the art will appreciate that the components of member 50 can be extruded through a single die. In a similar fashion, the components of member 44 can be extruded through a single die, as well, thereby completing weatherstrip 42. While such a method provides an expeditious and inexpensive means by which weatherstrip 42 can be manufactured, it should be understood that weatherstrip 42 can be made by other techniques without departing from the scope of the invention.

As discussed previously, weatherstrip 12 as depicted in FIGS. 1-3 provides a reduction in wind noise heard by passengers seated in the vehicle while also reducing the closing effort required to close door 14. Such advantages are exemplified in the following examples which are presented for illustrative purposes only, and are not to be considered as limiting the scope of the claims appended hereto.

Having described the invention in detail and by reference to preferred embodiments thereof, it will be apparent that modifications and variations are possible without departing from the scope of the invention which is defined in the appended claims. For example, materials other than those described herein may be used to form weatherstrip 12 or weatherstrip 42.

What is claimed is:

1. A weatherstrip for a vehicle having a seal gap define by a door and a door flange surrounding a door opening on said vehicle, said weatherstrip comprising:
    a first member having a bulb portion which is curvilinear in shape and an integrally joined base which is adhesively secured to said door, said first member comprising a rigid elastomeric material; and
    a second member having a gripping portion for affixing said second member to said door flange and an integrally joined securing channel correspondingly sized to receive said bulb portion of said first member when said door is in a closed position, said second member being mounted around said door opening such that said bulb portion is firmly secured in said securing channel when said door is in said closed position so as to substantially seal said seal gap, said second member comprising a resilient elastomeric material.

2. The weatherstrip of claim 1 wherein said gripping portion comprises a gripping channel for straddling said door flange and at least one rib on an internal wall of said gripping channel for affixing said second member to said door flange.

3. The weatherstrip of claim 2 further comprising a reinforcing wire located in said internal wall of said gripping channel.

4. The weatherstrip of claim 1 further comprising an interior trim flap extending from said gripping portion of said second member into the interior of said vehicle.

5. The weatherstrip of claim 1 wherein said resilient elastomeric material has a hardness in a range from about 20 Shore A to about 25 Shore A.

6. The weatherstrip of claim 1 wherein said rigid elastomeric material has a hardness in a range from about 30 Shore A to about 40 Shore A.

7. The weatherstrip of claim 1 wherein said gripping portion comprises two ribs which firmly secure said second member to said door flange.

* * * * *